United States Patent Office 2,775,950
Patented Jan. 1, 1957

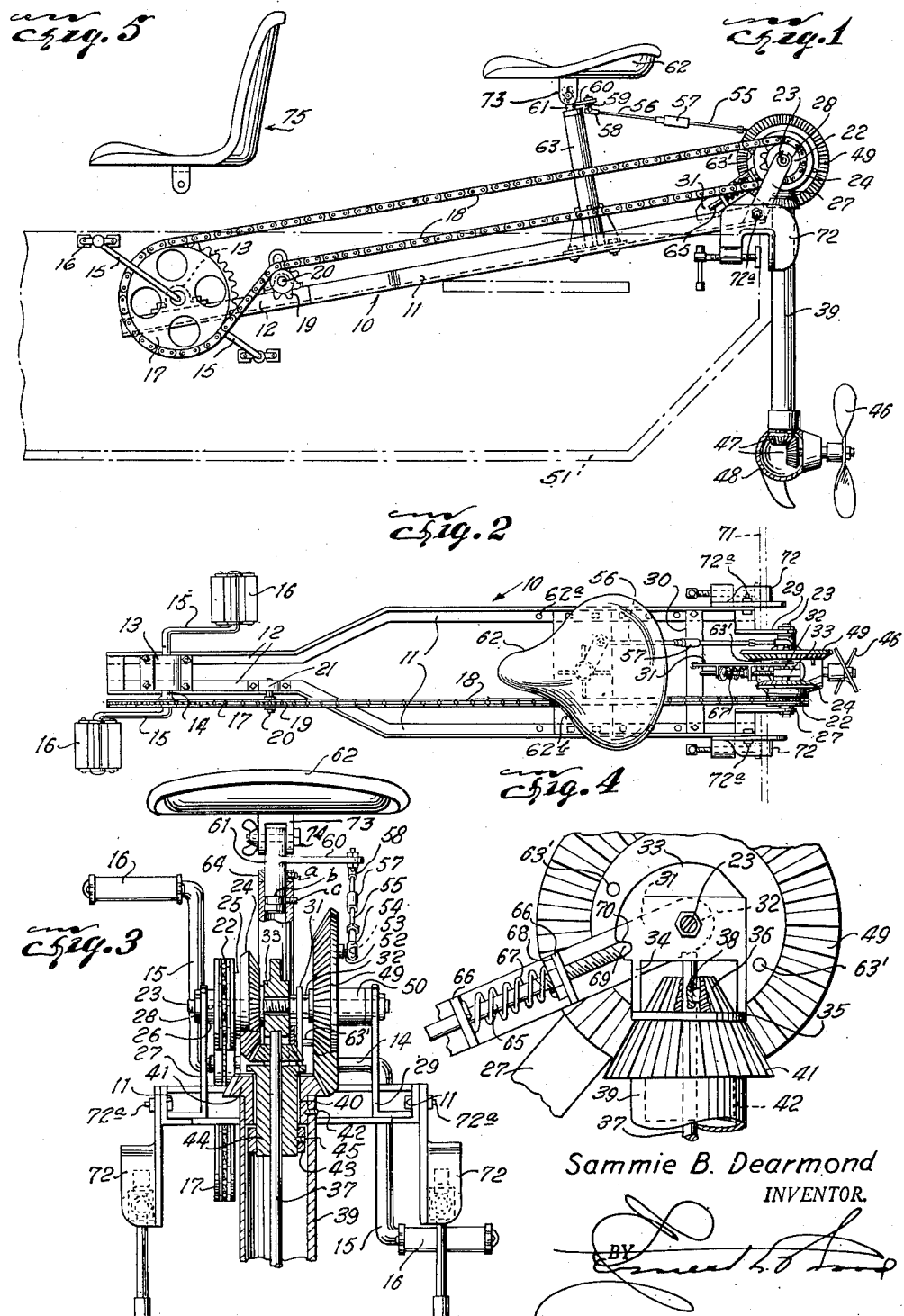

2,775,950

PEDAL PROPELLING ATTACHMENT FOR BOATS

Sammie B. Dearmond, Henderson, Tex.

Application May 13, 1954, Serial No. 429,603

4 Claims. (Cl. 115—25)

This invention relates to small boats and more particularly to a propelling and steering attachment for such boats.

The principal object of the invention is to provide a power transmission mechanism for a boat by which a propeller may be operated by means of foot pedals and an attachment which is unique in that oscillation of the operator's seat about a vertical axis will oscillate a gear on the propeller drive shaft housing at increased ratio to change the direction in which the boat is being propelled. Accordingly, when the operator shifts his position to the right, the boat will turn right and a similar maneuver to the left will cause the boat to turn left. This provision obviates the necessity for any form of hand operated steering means, leaving the boatman's hands free for casting, trolling, boating his catches or other duties requiring full use of both hands. To reverse forward movement, it is necessary only to reverse forward operation of the pedals. By a slight oscillation of body of operator, the angle of thrust of the propeller will be turned 90° in one direction and with a slight movement in the opposite direction the angle of thrust of the propeller will return to normal position and thence to 90° in the opposite direction. Consequently the boat can be moved in any direction from a still position. It can also be turned around within its own length.

Another object of the invention is to provide a power transmission attachment for boats in which provision is made for upward displacement of the propeller drive shaft should the propeller engage submerged articles, thus preventing damage to either the propeller or to the transmission mechanism.

Other objects will appear as the description proceeds when considered with the annexed drawing, wherein:

Figure 1 is a side elevational view of a structure embodying the invention shown mounted on a boat illustrated fargmentarily in dotted lines.

Figure 2 is a top plan view of the invention per se.

Figure 3 is a rear elevational view, partly in section.

Figure 4 is a fragmentary elevational view showing the trip mechanism for releasing the propeller drive shaft for upward pivotal displacement should the propeller engage submerged obstacles, and Figure 5 is a detail view of a modified form of seat.

Continuing with a more detailed description of the drawing, reference numeral 10 denotes generally a frame adapted to support the various elements of the propelling and steering mechanism and is subject to variation in design to adapt the same to boats of different manufacture. This frame consists of parallel, spaced apart rails 11 which converge near their forward ends into more closely spaced relationship at 12, providing thereby a mounting for a bearing 13 accommodating the crank shaft 14 on which cranks 15 are formed to carry foot pedals 16. A sprocket wheel 17 is mounted on the crank shaft 14 about which a sprocket chain 18 is trained, the lower lead of which is sustained by an idler sprocket 19, mounted on a stub shaft 20 journaled in a bearing 21 which is supported on one of the parallel mounting members 12 of the frame 10 and designed to permit adjustment of the idler sprocket 19 to increase or decrease slack in the chain 18.

The sprocket chain extends rearwardly and is trained over a sprocket wheel 22 mounted on an assembly arbor 23 which is threaded as shown. The sprocket 22 is preferably made integral with a power gear 24 through an intermediate annular thin spacing member 25. The sprocket has formed on its opposite face an annular flange 26 against which bears the upper end of a supporting bracket 27, the latter being bifurcated to receive an end of the assembly arbor 23 and onto which is threaded a retaining nut 28. The sprocket 22 and the power gear 24 are free to turn on the arbor 23. A similar bracket 29 is likewise bifuracted at its upper end to receive and support the opposite end of the assembly arbor.

Extending from one to the other of the frame members 11 is a cross-member 30 whose ends are bolted or welded to the members 11. Affixed to the midsection of the cross-member 30 is an upwardly and rearwardly extending arm 31 whose upper end is apertured to receive the arbor 23 and a nut 32 is threaded onto the latter from each end to bear against opposite sides of the arm 31 in the manner shown to preclude shifting of the arm in relation to the arbor 23. Further reference to this arm and its function will be made presently.

An assembly head 33 is provided with a transverse opening through which passes the arbor 23, and the assembly head, as shown in Figure 3, is located at the midsection of the arbor and held against lateral displacement by the power gear 24 on one side and one of the nuts 32 on the opposite side. The assembly head 33 is formed with parallel depending arms 34 (Figure 4) which support an annular bearing plate 35 for a drive pinion 36. A propeller drive shaft 37 extends upwardly through the drive pinion 36, to which it is secured as by a key 38 (Figure 4) and its upper end is journaled in the head 33, as shown.

The drive shaft 37 is embraced by a tubular housing 39 whose upper end receives the integral sleeve 40 of a bevel gear 41. One or more set screws 42 secures the tubular housing 39 to the sleeve 40 so that the gear and housing will turn in unison. The gear 41 is held against longitudinal slippage on the drive shaft 37 by means of a collar 43 which is mounted on the lower end of a tail portion or sleeve 44 (Figure 3) of the assembly head 33, the tail portion extending through the sleeve 40 of the gear 41. A set screw 45 (Figure 3) threaded through the retaining collar 43 bears against the tail portion 44 to support the gear 41.

It is evident from the foregoing that operation of the pedals 16 will cause the chain 18 to drive the power gear 24 through the sprocket wheel 22. The pinion 36, with which the power gear 24 meshes, is driven thereby to transmit rotation to the shaft 37, thus to operate the propeller 46 through conventional gears 47 in the propeller gear housing 48 (Figure 1).

Mounted on the assembly arbor 23 at the side of the assembly head 33 opposite the power gear 24 is a larger bevel gear 49. This gear 49 is also free to turn on the arbor 23 and is spaced from the end thereof by a spacing sleeve 50, interposed between the gear 49 and the bracket 29. A nut 32 previously referred to separates this gear from the angular arm 31 which is secured to and extends upwardly from the cross-member 30. The gear 49 is meshed with the gear 41 which latter is secured for rotation with the tubular drive shaft housing 39. Consequently, when gear 49 is rotated, the shaft housing will rotate, thus to change the direction of travel of the boat 51 (Figure 1).

To rotate the large gear 49, which may be referred to as the steering gear, a stem 52 (Figure 3) is welded or otherwise secured to the outer face of the gear 49 in spaced relation to its rotative axis. This stem carries a ball 53 which is received in a socket 54 mounted on the end of a steering rod which is composed of two axially aligned sections 55 and 56, secured together by means of a length adjustment coupling 57. The opposite end of the steering rod carries a socket 58 which receives a ball on the end of a stem 59, the latter being mounted on an arm 60 (Figures 1 and 3) which is affixed to and extends laterally from a short rod 61 on whose upper end a seat 62 is adjustably mounted in a manner to be presently explained. The seat 62 is made adjustable longitudinally on the frame 10 by virtue of matching, longitudinally spaced holes 62a in opposing frame members 11 to receive bolts holding a base plate 62b, to which is affixed the lower end of a standard 63 whose upper end supports the seat 62 on the frame 10. The rod 61 is rotatably disposed in the upper end of the seat supporting standard 63 so that the seat 62 will turn freely on the standard. A collar 64 is secured to the rod 61 by a set screw a and the rod 61 has an annular groove b therein adjacent its lower end to receive a set screw c threaded through the standard 63, thus to permit the seat to oscillate without vertical displacement. The seat 62, in turning, will impose tension or compression on the steering rod, thus to impart rotary or oscillative motion to gear 49 which, in turn, will rotate or oscillate the drive shaft housing 39 to change the course of the boat. The difference in ratio between the gear 49 and gear 41 makes it possible to move the seat but slightly to gain a wide degree of change in the course. The length adjustment 57 in the steering rod is for the purpose of taking up slack due to wear, but its primary purpose is to provide for adjustment of the seat 62 longitudinally of the frame to accommodate persons of different leg lengths.

To limit the degree of rotative displacement of the steering gear 49, diametrically opposed pins 63' are set in the inner face of the gear 49 and are adapted to be brought up against opposite edges of the arm 31 as the gear is turned by rotating the seat 62.

In order to prevent damage to the propeller or to the power transmitting mechanism, by collision of the propeller housing 48 with submerged obstacles, a plunger 65 is reciprocably mounted in aligned openings in lateral ears 66 affixed to one side of the arm 31 (Figure 4). A strong coil spring 67 has one end bearing against the lower ear 66 while its upper end bears against a nut 68 which is mounted on a threaded portion of the plunger 65 and which limits forward displacement of the plunger and serves also to adjust tension on the spring 67. The plunger 65 has a tapered upper end 69 which engages in a correspondingly shaped notch 70 in the base of the arcuately shaped top of the assembly head 33 and thus holds the head as well as its associated parts, including the housing 39, in upright position. However, should the gear housing 48 collide with a submerged obstacle, the spring 67 will yield to force tending to displace the plunger 65, releasing the same from locking position in the notch 70 to allow the propeller to ride over the obstacle. However, when the obstacle has been bypassed, the weight of the propeller and its associated parts will cause the assembly to resume its operative position and the plunger will be restored to its notch 70.

The attachment described is secured to the transom 71 of the boat 51 by clamps 72 which are attached by pivot bolts 72a to the ends of the frame member 11 so that the frame may assume a desired or proper angular relationship with the boat, its rear portion being usually supported on the boat seat so that the pedals 16 will be disposed below the level of the boat seat.

The arrangement is such that the propeller housing assembly is oscillatable on the arbor 23 and may be rotated thereon to a position where it may lie against the seat 62 for storage and transportation purposes.

The seat 62 may be adjustably supported on the standard in any suitable manner to maintain its proper position irrespective of the angular position of the frame 10 or the seat supporting standard 63. However, for purposes of illustration, a pair of ears 73 are affixed to the underside of the seat and are secured to the upper end of the rod 61 by a transverse bolt 74 which permits angular adjustment of the seat. A seat 75, equipped with a back support, is shown per se in Figure 5.

What is claimed is:

1. A propelling and steering attachment for a boat, comprising an elongate frame, an oscillatable seat on said frame, a cross-member affixed adjacent the rear end of said frame, an angular apertured brace affixed to and extending upwardly and rearwardly of said cross-member, an arbor extending through the aperture of said brace and held at its midsection to said brace, an assembly head mounted on and depending from said arbor, a bearing plate integral with said assembly head a power gear and sprocket wheel mounted on said arbor adjacent said assembly head, a propeller, a propeller drive shaft extending upwardly into said assembly head, a drive pinion supported on said bearing plate and affixed to said propeller drive shaft in said head and engaging said power gear, a propeller drive shaft housing having a bevel gear on its upper end disposed under said drive pinion, a steering gear rotatably mounted on said arbor and engaging said bevel gear, a steering rod pivoted at one end to said steering gear and at its opposite end to one side of said seat whereby oscillation of said seat will rotate said steering gear to change the direction of thrust of said propeller through said bevel gear and propeller drive shaft housing means for limiting the degree of rotation of said steering gear and pedal actuated means mounted on the forward end of said frame for driving said power gear through said sprocket wheel.

2. A propelling and steering attachment for a boat, comprising an elongate frame having its rear end clamped to the transom of said boat, a seat rotatably supported on said frame, a transverse arbor supported above the rear end of said frame, an assembly head suspended from said arbor at its approximate midsection having depending arms and a bearing plate supported by said arms, a propeller, driving gears for said propeller, a housing therefor, a propeller drive shaft connected to said driving gears and extending upwardly into said assembly head, a drive pinion affixed to the upper end of said propeller drive shaft in said head and supported on said bearing plate between said arms, a power gear mounted on said arbor and engaging said pinion, a first sprocket stationary with said power gear, a second sprocket wheel mounted on a crank shaft attached to the forward end of said frame, pedals mounted on said crank shaft, a chain engaging said first and second sprocket wheels for driving said propeller through said power gear and pinion, a tubular housing for said propeller drive shaft, a bevel gear mounted on the upper end thereof, a steering gear mounted on said arbor opposite said power gear and engaging said bevel gear and means connecting said steering gear and said seat to change the direction of thrust of said propeller when said seat is rotated.

3. A propelling and steering attachment for a boat, comprising an elongate frame having one end clamped to the transom of said boat and extending downwardly toward the bow thereof, a seat rotatably mounted on said frame, an abor supported at each end and at its midsection from and above the rear end of said frame, an assembly head depending from said arbor having a bearing plate, a propeller and a propeller drive shaft, the latter extending upwardly into said assembly head, a propeller drive shaft pinion affixed to the upper end of said propeller drive shaft in said head and supported on said bearing plate, a power gear mounted on said arbor and engaging said drive pinion, foot actuated means forwardly on said frame for imparting rotation to said power gear to operate said propeller through said propeller drive shaft, a propeller drive shaft housing, a bevel gear on the upper end of said propeller drive shaft housing, a steering gear a longitudinally adjustable rod having one end pivoted to one side of said steering gear and its opposite end pivotally connected to a rotatable portion of said seat whereby rotation of the latter will impart oscillative movement to said steering gear effective to change the angle of thrust of said propeller.

4. A propelling and steering attachment for a boat, comprising an elongate frame having one end clamped to the transom of said boat and extending downwardly toward the bow thereof, a seat rotatably mounted on said frame, an arbor supported at each end and at its midsection from and above the rear end of said frame, an assembly head depending from said arbor, a propeller and a propeller drive shaft, the latter extending upwardly into said assembly head, a propeller drive shaft pinion affixed to the upper end of said propeller drive shaft in said head, a power gear mounted on said arbor and engaging said drive pinion, foot actuated means forwardly on said frame for imparting rotation to said power gear to operate said propeller through said propeller drive shaft, a propeller drive shaft housing, a bevel gear on the upper end of said propeller drive shaft housing, a steering gear, means connecting said steering gear and seat whereby rotation of the latter will impart oscillative movement to said steering gear effective to change the angle of thrust of said propeller, and a spring biased plunger carried by the midsectional support of said arbor normally held in a notch in said assembly head to resist rotative displacement of said assembly head on said arbor.

References Cited in the file of this patent

UNITED STATES PATENTS

| | | |
|---|---|---|
| 1,826,507 | Crosby | Oct. 6, 1931 |
| 1,866,482 | Olsen | July 5, 1932 |
| 2,612,859 | Billman et al. | Oct. 7, 1952 |